(12) United States Patent
Chopra et al.

(10) Patent No.: US 9,096,768 B2
(45) Date of Patent: Aug. 4, 2015

(54) CURABLE PHASE CHANGE INK COMPOSITIONS

(71) Applicant: XEROX CORPORATION, Norwalk, CT (US)

(72) Inventors: Naveen Chopra, Oakville (CA); Adela Goredema, Mississauga (CA); Nathan M. Bamsey, Burlington (CA); Biby Abraham, Mississauga (CA); Kentaro Morimitsu, Mississauga (CA); Michelle Chretien, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 149 days.

(21) Appl. No.: 13/968,014

(22) Filed: Aug. 15, 2013

(65) Prior Publication Data

US 2015/0051342 A1 Feb. 19, 2015

(51) Int. Cl.
*C09D 11/02* (2014.01)
*C09D 11/106* (2014.01)

(52) U.S. Cl.
CPC .................................... *C09D 11/106* (2013.01)

(58) Field of Classification Search
CPC ..................................................... C09D 11/106
USPC ................................................. 523/160, 161
See application file for complete search history.

(56) References Cited

U.S. PATENT DOCUMENTS

| | | |
|---|---|---|
| 5,195,430 A | 3/1993 | Rise |
| 5,231,135 A | 7/1993 | Machell et al. |
| 5,389,958 A | 2/1995 | Bui et al. |
| 5,621,022 A | 4/1997 | Jaeger et al. |
| 6,221,137 B1 | 4/2001 | King et al. |
| 6,472,523 B1 | 10/2002 | Banning et al. |
| 6,476,219 B1 | 11/2002 | Duff et al. |
| 6,576,747 B1 | 6/2003 | Carlini et al. |
| 6,576,748 B1 | 6/2003 | Carlini et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,896,937 B2 | 5/2005 | Woudenberg |
| 6,958,406 B2 | 10/2005 | Banning et al. |
| 7,053,227 B2 | 5/2006 | Jaeger et al. |
| 7,381,831 B1 | 6/2008 | Banning et al. |
| 7,427,323 B1 | 9/2008 | Birau et al. |
| 2007/0142492 A1* | 6/2007 | Odell et al. .................. 522/74 |
| 2011/0152397 A1 | 6/2011 | Breton et al. |
| 2012/0013690 A1 | 1/2012 | Breton et al. |
| 2012/0274699 A1 | 11/2012 | Belelie et al. |

FOREIGN PATENT DOCUMENTS

EP 1 950 259 * 7/2008

* cited by examiner

*Primary Examiner* — Doris Lee
(74) *Attorney, Agent, or Firm* — Shimokaji IP

(57) ABSTRACT

A phase change ink composition is provided comprising a UV-curable component, a crystalline component, and an amorphous component, wherein the addition of a UV-curable component imparts improved robustness over the ink that contains only crystalline and amorphous materials.

13 Claims, 3 Drawing Sheets

CURABLE PHASE CHANGE INK COMPOSITIONS

BACKGROUND

The present embodiments relate to phase change ink compositions characterized by being solid at room temperature and molten at an elevated temperature at which the molten ink is applied to a substrate. These phase change ink compositions can be used for ink jet printing. The present embodiments are directed to a novel phase change ink composition comprising an amorphous component, a crystalline material, and optionally a colorant, and methods of making the same.

Ink jet printing processes may employ inks that are solid at room temperature and liquid at elevated temperatures.

The phase change ink compositions are characterized by being solid at room temperature (e.g., 20-27° C.) and molten at an elevated temperature at which the molten ink is applied to a substrate. While current ink options are successful for porous paper substrates, these options are not always satisfactory for coated paper substrates.

In general, phase change inks (sometimes referred to as "hot melt inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops. Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. These phase change inks can comprise four component dyes or pigments, namely, cyan, magenta, yellow and black, although the inks are not limited to these four colors. These phase change inks can be formed by using a single dye or pigment or a mixture of dyes or pigments.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional phase change ink technology is successful in producing vivid images and providing economy of jet use on porous papers, such technology has not been satisfactory for coated substrates. Thus, while known compositions and processes are suitable for their intended purposes, a need remains for additional means for forming images or printing on coated paper substrates.

As such, there is a need to find alternative compositions for phase change ink compositions and future printing technologies to provide customers with excellent image quality on all substrates. It is also desired to provide a phase change ink having significantly improved ink robustness, fold offset and rub resistance. Curable phase change inks using amide resin designs have significantly improved ink robustness, fold offset and rub resistance when compared to phase change inks that use waxy materials or other phase-change inks. To test robustness of prints, inks were K-proofed on coated paper (DCEG: Xerox Colour Elite Gloss, 120 gsm). The K-proof sample was duplicated for scratch, fold, and fold offset examination. Then, the K-proofs were spread by feeding each print through a Typhoon fixture at 1 inch/second at a drum and paper temperature of 50° C. with the ink surface facing the transfix drum.

SUMMARY

According to one embodiment, there is provided an ink composition comprising a crystalline component, a UV curable component, an amorphous component, and a colorant.

In another embodiment, there is provided an ink composition comprising a crystalline component having a viscosity of less than 12 cps at a temperature of about 140° C. and a viscosity of greater than $1 \times 10^6$ cps at room temperature, a UV curable component, an amorphous component, and a colorant.

In a further embodiment, there is provided an ink composition comprising a crystalline component, a UV curable component, an amorphous component having a viscosity of less than 100 cps at a temperature of about 140° C. and a viscosity of greater than $1 \times 10^6$ cps at room temperature, and a colorant.

BRIEF DESCRIPTION OF THE FIGURES

Various embodiments of the present disclosure will be described herein below with reference to the following figures wherein.

DETAILED DESCRIPTION

Figure 1:
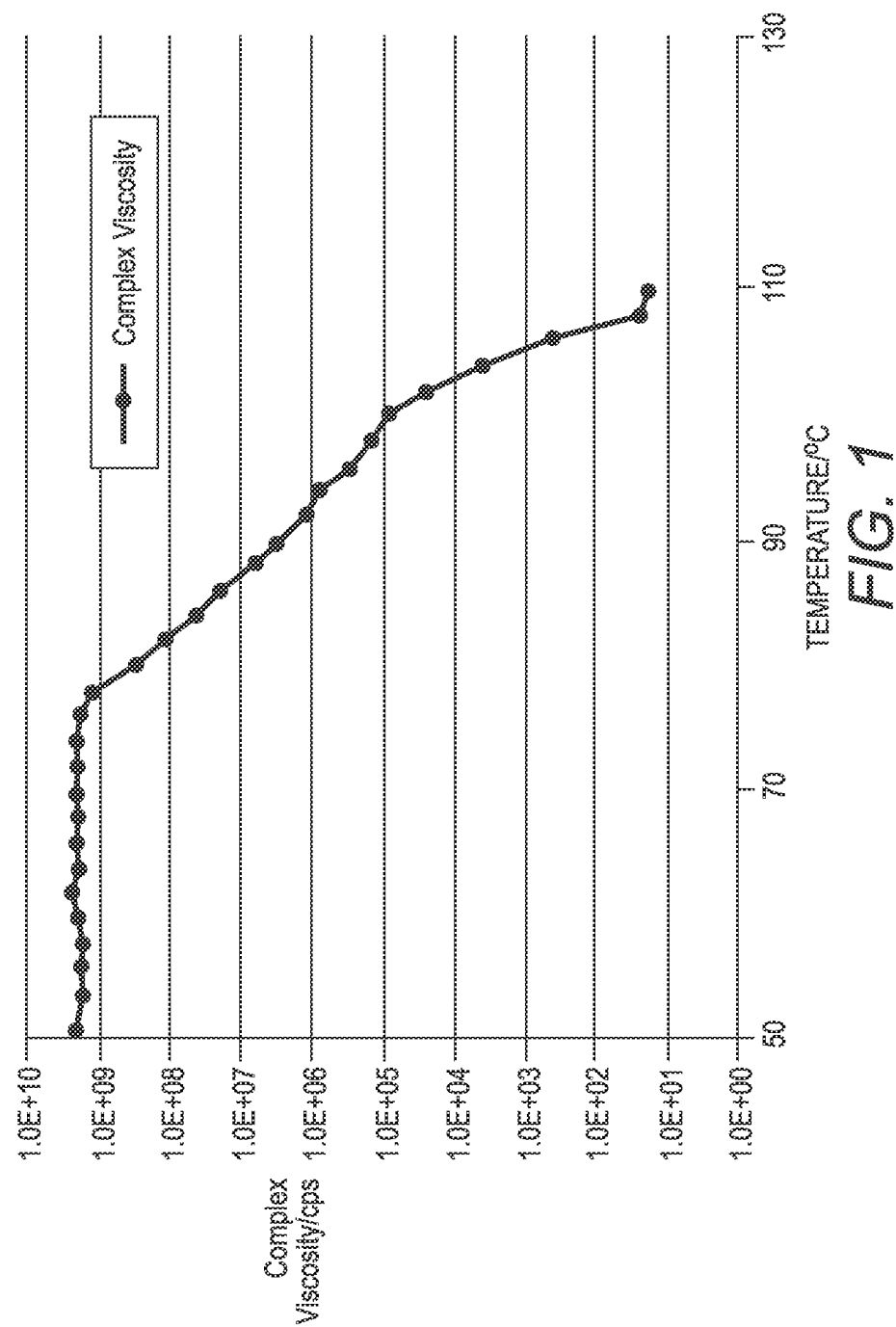
FIG. 1 illustrates ink viscosity measurements for Formulation 15A of an embodiment herein.

The following detailed description is of the best currently contemplated modes of carrying out various embodiments. The description is not to be taken in a limiting sense, but is made merely for the purpose of illustrating the general principles of the embodiments, since the scope of the embodiments is best defined by the appended claims.

Various inventive features are described below that may each be used independently of one another or in combination with other features. However, any single inventive feature may not address any of the problems discussed above or may only address one of the problems discussed above. Further, one or more of the problems discussed above may not be fully addressed by any of the features described below.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

The term "optional" or "optionally" refer, for example, to instances in which a subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs.

In embodiments herein, a mixture of crystalline and amorphous components in phase change ink formulations provides robust inks and, in particular, phase change inks which demonstrate robust images on uncoated and coated paper. Using this approach is surprising, however, due to the known properties of crystalline or amorphous materials. For crystalline materials, small molecules generally tend to crystallize when solidifying and low molecular weight organic solids are generally crystals. While crystalline materials are generally harder and more resistant, such materials are also much more brittle, so that printed matter made using a mainly crystalline ink composition is fairly sensitive to damage. Amorphous materials, such as high molecular weight materials such as polymers, become viscous and sticky liquids at high temperature, but do not show sufficiently low viscosity at high temperatures. As a result, polymers cannot be jetted from print head nozzles at a desirable jetting temperature. In the present embodiments, however, a robust phase change ink can be obtained through a blend of crystalline and amorphous components.

The present embodiments provide an ink jet phase change ink composition which comprises a blend of (1) crystalline and (2) amorphous components, generally in a weight ratio of from about 60:40 to about 95:5, or from about 65:35 to about 95:5, or from about 70:30 to about 90:10 or about 80:20 for the crystalline and amorphous components, respectively. In addition, the ink may also include a UV curable component (which may be either a crystalline or amorphous component in itself). Generally the UV curable component is present in a weight ratio to the crystalline component from about 40:60 to about 5:95, or from about 35:65 to about 5:95, or from about 30:70 to about 10:90, or about 20:80 for the UV curable and crystalline components, respectively.

Each component imparts specific properties to the phase change inks, and the blend of the components provides inks that exhibit excellent robustness on uncoated and coated substrates. The crystalline component in the ink formulation may drive the phase change through rapid crystallization on cooling. The crystalline component may also set up the structure of the final ink film and may create a hard ink by reducing the tackiness of the amorphous component. The crystalline components can exhibit crystallization, relatively low viscosity (less than or equal to $10^1$ centipoise (cps), or from about 0.5 to about 10 cps, or from about 1 to about 10 cps) at about 140° C. and high viscosity (>$10^6$ cps) at room temperature. Because the crystalline components may dictate the phase change of the ink, rapid crystallization can be needed to allow further immediate print processing if required (i.e., spreading, duplex printing, etc.) and to prevent excessive showthrough on uncoated substrates. By differential scanning calorimetry (DSC) (10° C./min from −50 to 200 to −50° C.), desirable crystalline components show sharp crystallization and melting peaks, and the delta T between them is less than 55° C. In certain embodiments, the melting point can be below 150° C., which can be the upper limit of the jetting temperature or, in other embodiments, below from about 145 to about 140° C. The melting point can also be in additional embodiments above 65° C. to prevent blocking and print transfer upon standing at temperatures up to 65° C., or above about 66° C., or above about 67° C.

Crystalline Component

Any crystalline compound with an aromatic ring core can be employed for use as the crystalline component of a phase change ink according to embodiments herein. For example, mono-amide compounds with an aromatic ring core chosen from a benzene group or a naphthalene group, can be used. In an embodiment, the crystalline mono-amide compound is a product of a reaction of benzoic acid and a primary or secondary amine.

The amide group of the crystalline mono-amide component can include at least one C1 to C40 substituent group bonded to either a carbonyl group or a nitrogen atom of the amide. The substituent group can be a substituted or unsubstituted, linear, branched or cyclic, saturated or unsaturated, aliphatic or aromatic group that will result in a crystalline compound that provides the desired ink properties, such as a liquid phase state with suitable viscosity at jetting temperatures and solid phase state at about room temperature (e.g., about 25° C.).

One exemplary crystalline mono-amide compound can be a compound of formula 1:

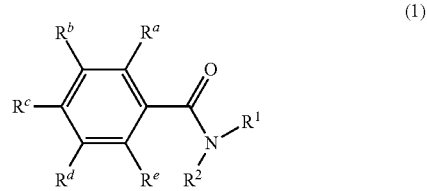

(1)

wherein $R^1$, $R^2$, $R^a$, $R^b$, $R^c$, $R^d$, and $R^e$ are independently selected from the group consisting of a hydrogen atom and C1 to C40 aliphatic or C1 to C40 aromatic substituents, wherein at least one of $R^1$ and $R^2$ is not a hydrogen atom. In an embodiment, $R^1$, $R^2$, $R^a$, $R^b$, $R^c$, $R^d$, and $R^e$ are independently selected from the group consisting of a hydrogen atom or substituted or unsubstituted linear, branched or cyclic C1 to C40 alkyl, alkenyl, aryl, alkaryl, arylakyl groups or any C1 to C40 alkyl, alkenyl, aryl, alkaryl or arylalkyl groups containing one or more hetero atoms. For example, $R^1$, $R^a$, $R^b$, $R^c$, $R^d$, and $R^e$ can be hydrogen atoms and $R^2$ can be chosen from an alkylphenyl group or a C8 to C30 hydrocarbyl group. Some specific examples of these compounds are:

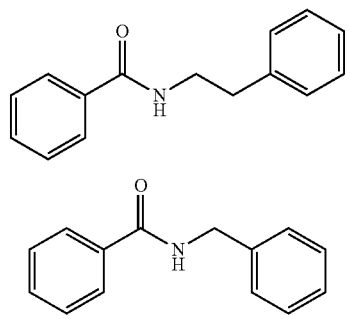

-continued

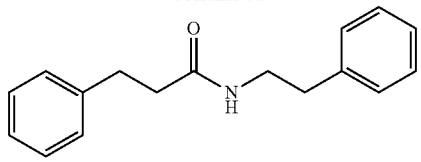

Substituents with carbon chains longer than 22 carbon atoms may form a wax-based crystalline component. In some cases, it may be desirable to employ a non-wax-based crystalline component, in which case the groups substituted on the mono-amide crystalline component may have chain lengths of 22 carbon atoms or less. For example, the $R^1$ and $R^2$ substituents discussed above can be selected from linear, branched or cyclic, substituted or unsubstituted, aliphatic or aromatic C2 to C18 groups, such as C2 to C18 alkyl, alkenyl, aryl, alkaryl, arylakyl groups optionally containing one or more heteroatoms (e.g., oxygen, nitrogen or halogen, such as chlorine or bromine). Specific examples of these compounds are:

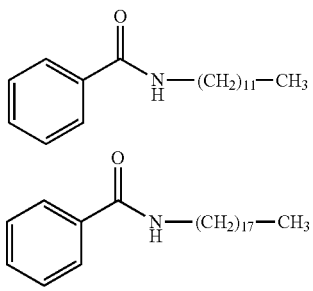

The crystalline component in the ink formulations herein can drive the phase change through rapid crystallization as the ink cools. The crystalline component may also set up the structure of the final ink film and create a hard ink by reducing the tackiness of the amorphous component. The crystalline components can exhibit relatively low viscosity, such as a viscosity of less than 12 cps at a temperature of about 140° C., such as, for example, ≤$10^1$ centipoise (cps), or from about 0.5 to about 10 cps, or from about 1 to about 10 cps, at about 140° C.

The crystalline components herein can exhibit relatively high viscosity, such as, for example greater than $10^{5.5}$ cps at room temperature, such as greater than about $10^6$ cps or about $10^{6.5}$ cps, at about room temperature. Viscosity was measured using a controlled-strain rheometer from TA Instruments (Rheometrics RFS-3). The method used was temperature sweep from about 140° C. to about 90° C. at 1 Hz sweep rate with measurements taken every 5 degrees. Depending on the resin tested, the temperature sweep end temperature was governed by the viscosity. When the transition point was passed and the viscosity sharply increased, the temperature sweep test experiment was ended.

Because the crystalline components may generally dictate the phase change of the ink, rapid crystallization can provide immediate print processing (e.g., spreading or duplex printing) and reduce or prevent excessive show through on uncoated substrates.

Desirable crystalline components can show relatively sharp crystallization and melting peaks, as determined by, for example, differential scanning calorimetry (DSC) (e.g., 10° C./min from −50 to 200 to −50° C.). In an embodiment, the change in temperature between the crystallization and melting peaks is relatively small, such as, for example, less than about 55° C. or about 60° C. In an embodiment, the melting point can be below the upper limit of the jetting temperature. For example, the melting point can be below about 150° C., or about 100° C. to about 145° C., or about 140° C. A suitable melting point can reduce or prevent blocking and print transfer and may vary depending on standing temperatures that occur in the printing apparatus. For example, the melting point can be above 65° C., such as above 66° C. or 67° C., to reduce or prevent blocking and print transfer upon standing at temperatures up to 65° C.

Amorphous Component

The amorphous component can be chosen from polycyclic amides, such as polycyclic mono-amides, polycyclic diamides or mixtures thereof. Any polycyclic amides that are suitable as the amorphous component for phase change ink compositions can be employed. Examples of suitable polycyclic amide compounds include those with an abietyl moiety, such as compounds of formula 2:

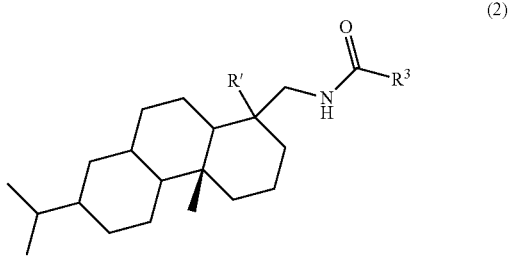

(2)

wherein R' is selected from the group consisting of a hydrogen atom or —NHC=$OR^4$, and $R^3$ and $R^4$ are independently selected from the group consisting of C1 to C40 substituted or unsubstituted aliphatic or C1 to C40 substituted or unsubstituted aromatic substituents, such as C1 to C22 or C2 to C18 aliphatic or aromatic groups. In an embodiment, R' is hydrogen and $R^3$ is a C1 to C12 alkyl. Specific examples of these compounds include:

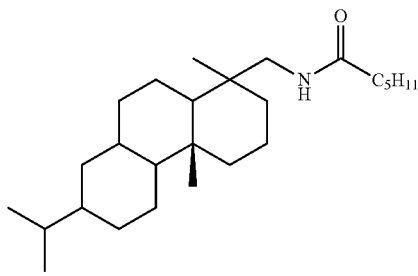

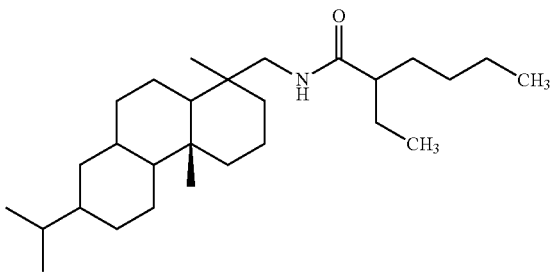

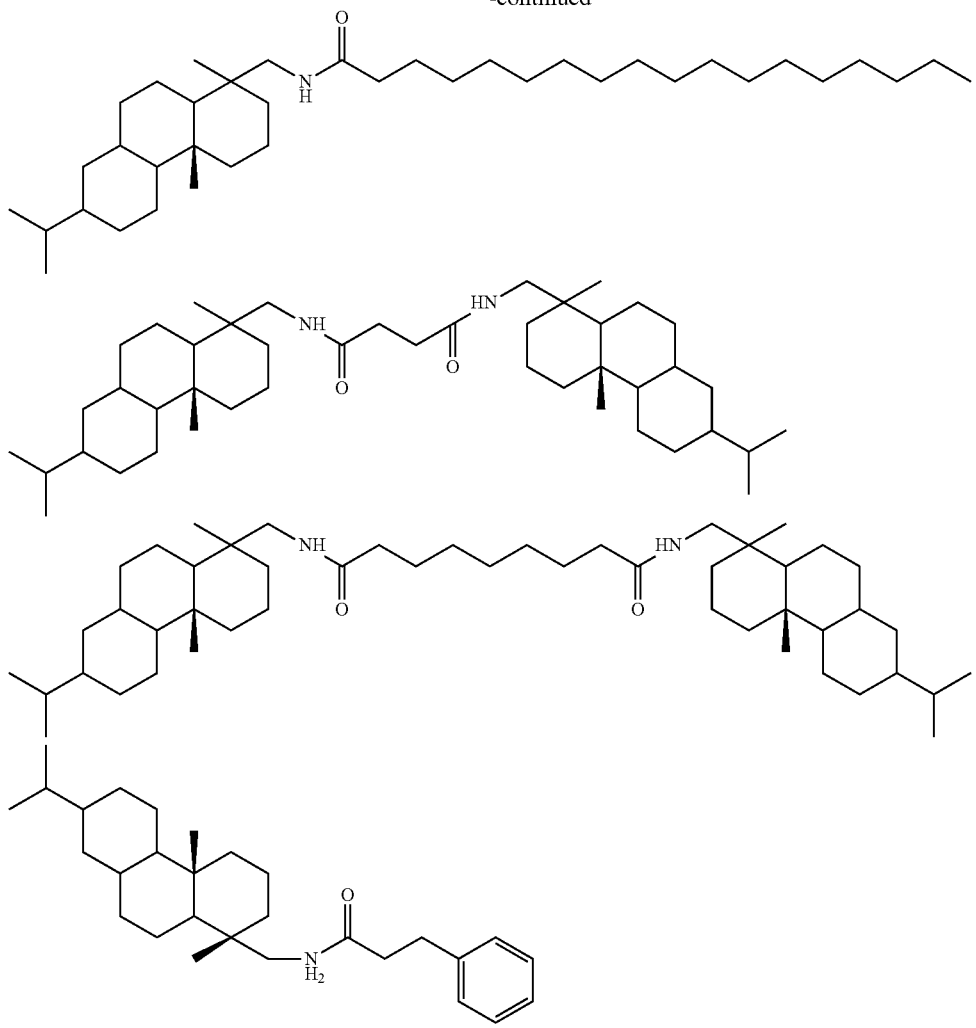

In an embodiment, one or more of the rings of the compounds of formula 2 can be unsaturated, such as shown, for example, in formula 3, where R' and R³ are defined the same as described above for formula 2:

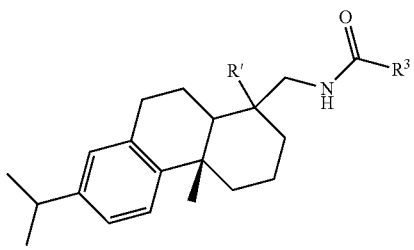

(3)

In other embodiments, a diester of tartaric acid of formula 4 can be used as the amorphous component:

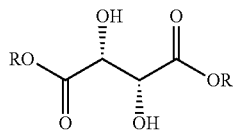

(4)

wherein R is a 50:50 mixture of 4-tert-butyl cyclohexanol and cyclohexanol moiety of formula 5 below:

(5)

In an embodiment, a 50:50 mixture of 4-tert-butyl cyclohexanol and cyclohexanol as the alcohol moieties can be used to make the 4-tert-butyl cyclohexyl, cyclohexyl tartrate of formula 4.

The amorphous components can provide tackiness and impart robustness to the printed ink. In present embodiments, desirable amorphous materials have relatively low viscosity ($<10^2$ cps, or from about 1 to about 100 cps, or from about 5 to about 95 cps) at about 140° C., but very high viscosity ($>10^5$ cps) at room temperature. The low viscosity at 140° C. provides wide formulation latitude while the high viscosity at room temperature imparts robustness. The amorphous materials have Tg's (glass transition temperatures) but do not exhibit crystallization and melting peaks by DSC (10° C./min from −50 to 200 to −50° C.). The $T_g$ values are typically from about 10 to about 50° C., or from about 10 to about 40° C., or from about 10 to about 35° C., to impart desired toughness and flexibility to the inks. The selected amorphous materials may have low molecular weights, such as less than 1000 g/mol, or from about 100 to about 1000 g/mol, or from about 200 to about 1000 g/mol, or from about 300 to about 1000 g/mol. Higher molecular weight amorphous materials such as polymers become viscous and sticky liquids at high temperatures, but have viscosities that can be too high to be jettable with piezoelectric printheads at desirable temperatures.

UV Curable Component

The present embodiments can include a UV curable component as a reactive component of the ink that can undergo UV curing to form a polymer. The addition of a UV curable component may improve the robustness of the ink. Since the high viscosity of polymers may preclude the formulation of a jettable composition, it can be advantageous to use with a low viscosity reactive component (monomer) that can polymerize to form a polymer on the substrate.

In some embodiments, UV curable monomers such as (meth)acrylates that are solids at room temperature may be used, although in some embodiments, liquid monomers may also be used where the final ink composition is a solid at room temperature. Examples of UV curable monomers can include those that are solids at room temperature, such as for example cyclohexane dimethanol diacrylate, multifunctional acrylates such as for example dipentaerithritol pentaaacrylate and oligomers, such as for example, hyperbranched polyester acrylate oligomer, polyester acrylate oligomer, low viscosity polyester acrylate oligomer, and trifunctional urethane acrylate oligomer.

In one embodiment, tris (2-hydroxyethyl) isocyanurate triacrylate of formula 6 can be used.

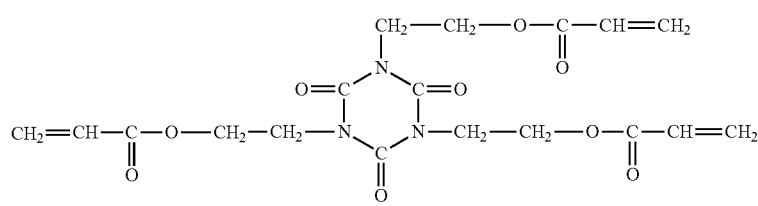

(6)

Additives

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

Antioxidants

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis (4-(2-(3,5-di-tert-butyl-4-hydroxyhydrocinnamoyloxy)) ethoxyphenyl)-propane (TOPANOL-205, available from Vertellus); tris(4-tert-butyl-3-hydroxy-2,6-dimethyl benzyl) isocyanurate (Aldrich); 2,2'-ethylidene bis(4,6-di-tert-butylphenyl)fluoro phosphonite (ETHANOX-398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); .alpha.-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl)benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD 76, NAUGARD 445, NAUGARD 512, and NAUGARD 524 (manufactured by Chemtura Corporation); and the like, as well as mixtures thereof. The antioxidant, when present, may be present in the ink in any desired or effective amount, such as from about 0.25 to about 10% by weight of the ink or from about 1 to about 5% by weight of the ink, or from about 1.5 to about 2.5% by weight of the ink.

Colorants

In embodiments, the phase change ink compositions described herein can also include a colorant. The ink of the present embodiments can thus be one with or without colorants. The phase change ink may optionally contain colorants such as dyes or pigments. The colorants can be either from the cyan, magenta, yellow, black (CMYK) set or from spot colors obtained from custom color dyes or pigments or mixtures of pigments. Dye-based colorants are miscible with the ink base composition, which comprises the crystalline and amorphous components and any other additives. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR(C.I. Solvent Black 35) (Chemische Fabriek Triade BV); Morton Morplas Magenta 36 (CA. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the phase change inks herein. Examples of suitable pigments include PALIOGEN Violet 5100 (BASF); PALIOGEN Violet 5890 (BASF); HELIOGEN Green L8730 (BASF); LITHOL Scarlet D3700 (BASE); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL. (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523; U.S. Pat. No. 6,726,755; U.S. Pat. No. 6,476,219; U.S. Pat. No. 6,576,747; U.S. Pat. No. 6,713,614; U.S. Pat. No. 6,663,703; U.S. Pat. No. 6,755,902; U.S. Pat. No. 6,590,082; U.S. Pat. No. 6,696,552; U.S. Pat. No. 6,576,748; U.S. Pat. No. 6,646,111; U.S. Pat. No. 6,673,139; U.S. Pat. No. 6,958,406; U.S. Pat. No. 6,821,327; U.S. Pat. No. 7,053,227; U.S. Pat. No. 7,381,831; and U.S. Pat. No. 7,427,323, the disclosures of each of which are incorporated herein by reference in their entirety.

In embodiments, solvent dyes can be employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

The ink compositions can be prepared by any desired or suitable method. For example, each of the components of the ink carrier can be mixed together, followed by heating the mixture to at least its melting point, for example, from about 60° to about 150° C., or from about 80° C. to about 145° C., or from about 85° C. to about 140° C. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture may then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. The inks can be employed in apparatus for direct printing ink jet processes and in indirect (offset) printing ink jet applications.

Another embodiment disclosed herein is directed to a process which comprises incorporating an ink as disclosed herein into an ink jet printing apparatus, melting the ink, and causing droplets of the melted ink to be ejected in an image-wise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an image-wise pattern onto an intermediate transfer member, and transferring the ink in the image-wise pattern from the intermediate transfer member to a final recording substrate.

In a specific embodiment, the intermediate transfer member can be heated to a temperature above that of the final recording sheet and below that of the melted ink in the printing apparatus. In another specific embodiment, both the intermediate transfer member and the final recording sheet can be heated; in this embodiment, both the intermediate transfer member and the final recording sheet can be heated to a temperature below that of the melted ink in the printing apparatus; in this embodiment, the relative temperatures of the intermediate transfer member and the final recording sheet can be heated to (1) a temperature above that of the final recording substrate and below that of the melted ink in the printing apparatus; (2) to a temperature above that of the intermediate transfer member and below that of the melted ink in the printing apparatus; or (3) to approximately the same temperature. An offset or indirect printing process is also disclosed in, for example, U.S. Pat. No. 5,389,958, the disclosure of which is totally incorporated herein by reference. In one specific embodiment, the printing apparatus may employ a piezoelectric printing process wherein droplets of the ink are caused to be ejected in an image-wise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed in the printing processes of the present disclosure. Example substrates include plain papers such as XEROX® 4200 papers, XEROX® Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX® Digital Color Elite Gloss, Sappi Warren Papers LUSTROGLOSS, specialty papers such as XEROX® DURAPAPER, and the like, transparency materials, fabrics, textile products, plastics, polymeric films, inorganic recording mediums such as metals and wood, and the like.

The inks described herein are further illustrated in the following examples. All parts and percentages are by weight unless otherwise indicated. It will be appreciated that the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

EXAMPLES

Example 1

Three crystalline-amorphous ink compositions were prepared using N-phenylethylbenzamide (N-PEB) as the crystalline material and 4-tert-butyl cyclohexyl, cyclohexyl tartrate (TBCT) as the amorphous material. Preliminary scoping experiments were done with UV curable monomers that are solid at room temperature to enable handling of the inks without offsetting. SR-368 was added as the UV curable component.

TABLE 1

| Component | Ink A wt % | Ink A m/g | Ink B wt % | Ink B m/g | Ink C wt % | Ink C m/g | Ink D Control wt % | Ink D Control m/g |
|---|---|---|---|---|---|---|---|---|
| N-PEB | 73.9 | 7.39 | 68.9 | 6.89 | 58.9 | 5.89 | 75.7 | 15.2 |
| SR368 | 5.0 | 0.50 | 10.0 | 1.0 | 20.0 | 2.00 | 11.0 | 2.21 |
| Irgacure 379 | 3.0 | 0.30 | 3.0 | 0.30 | 3.0 | 0.30 | — | — |
| Irgacure 819 | 0.50 | 0.05 | 0.50 | 0.05 | 0.5 | 0.05 | — | — |
| Esacure KIP150 | 4.0 | 0.40 | 4.0 | 0.40 | 4.0 | 0.40 | — | — |
| Irgastab UV10 | 0.2 | 0.02 | 0.2 | 0.02 | 0.2 | 0.02 | — | — |
| Pigment Concentrate | 13.4 | 1.34 | 13.4 | 1.34 | 13.4 | 1.34 | 13.3 | 2.67 |
| Total | 100 | 10 | 100 | 10 | 100 | 10 | 100 | 10 |

Pigment concentrate made form 67% TBCT, PEI dispersant and SunFlo SFD-B124 synergist FIG. 1 illustrates ink viscosity measurements for Ink A and shows a viscosity of 17.6 cps and an transition temperature of 110° C., indicating that the ink of Ink A is suitable for jetting.

Figure 2:
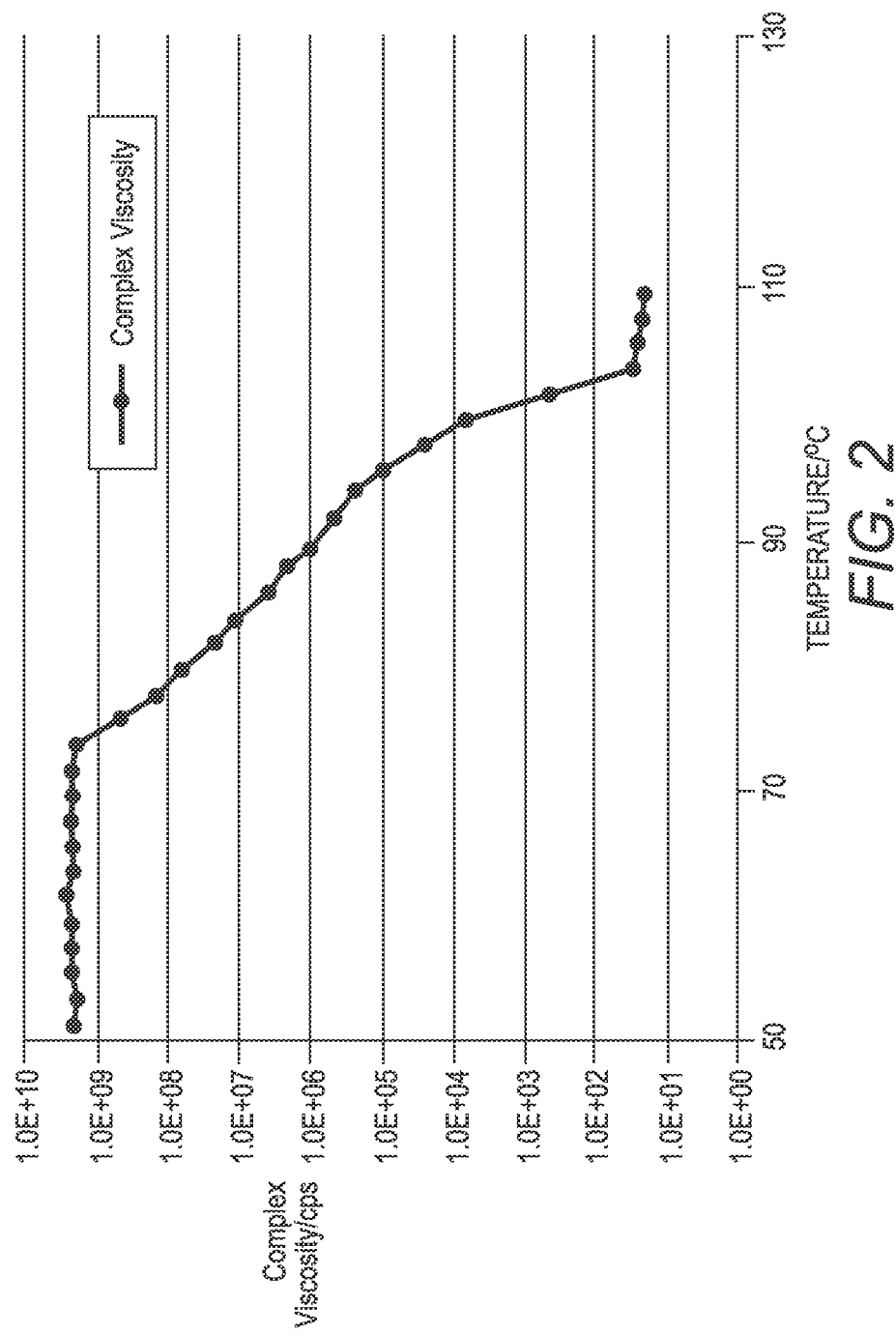
FIG. 2 illustrates ink viscosity measurements for Formulation 15B of an embodiment herein.

FIG. 2 illustrates ink viscosity measurements for Ink B and shows a viscosity of 18.5 cps and a transition temperature of 110° C., indicating that the ink of Ink B is suitable for jetting.

Figure 3:
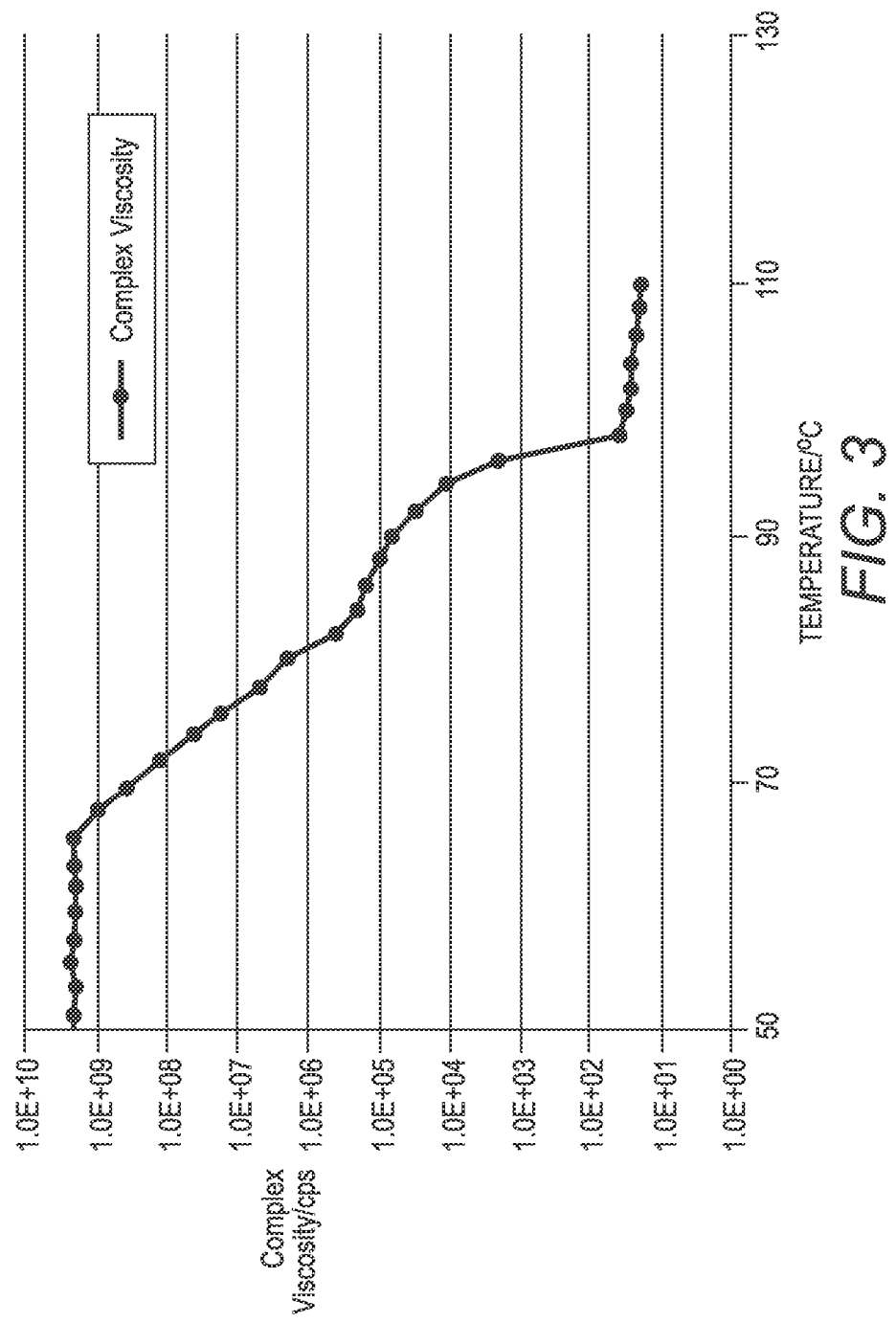
FIG. 3 illustrates ink viscosity measurements for Formulation 15C of an embodiment herein.

FIG. 3 illustrates ink viscosity measurements for Ink C and shows a viscosity of 18.3 cps and a transition temperature of 110° C., indicating that the ink of Ink C is suitable for jetting.

The formulations in Table 1 were small scale test ink formulations prepared with 5, 10, and 20% SR368 acrylate monomer to determine the optimal loading of SR368 monomer based on K-proof robustness tests. The results in Table 2 illustrate that Formulation 15C showed improvement in the fold offset results (scoring a 1.5) and fold crease result (scoring a 1). The results in Table 2 illustrate slight improvements in the results for Inks A and B, (which scored 2.5 on the fold offset and scored 1.5 on the fold crease) demonstrating that Ink C (with 20% SR368 monomer) could be the best ink of the three. This was scaled up as Ink C' (identical formulation as Ink C).

Curing Procedure

Ink K-proofs and prints were cured by passing the prints through a Fusions UV conveyor belt system cured at 32 fpm (feet per minute) using a Fusions UV 600W lamp fitted with a D bulb at 100% power.

Ink K-Proofing and Robustness Tests

To test robustness of prints, Inks A, B, and C were printed onto Xerox® Digital Color Elite Gloss, 120 gsm (DCEG) coated papers using the K-proofer gravure printing plate, which is rigged with a pressure roll set at low pressure. The gravure plate temperature was set at 142° C., but the actual plate temperature was about 134° C. The K-proofer apparatus (manufactured by RK Print Coat Instrument Ltd., Litlington, Royston, Heris, SG8 0OZ, U.K.) is a useful printing tool to screen a variety of inks at small scale and to assess image quality on various substrates. The inks gave robust images that could not be easily removed from the substrates. When a metal tip with a curved tip at an angle of about 15° from vertical, with a weight of 528 g applied, was drawn across the image at a rate of approximately 13 mm/s no ink was visibly removed from the image. The tip is similar to a lathe round nose cutting bit with radius of curvature of approximately 12 mm.

Ink Printing and Robustness Tests

Inks were printed using a Phaser 8860 modified to print direct-to-paper. Print resolution was 563×400 dpi (dots per inch) with a measured drop mass of 24.9 nanograms. Prints were generated on 40° C. coated substrate (DCEG: Xerox Colour Elite Gloss, 120 gsm). Prints were then cured at 32, 78, 162 and 220 fpm and tested for robustness. The inks gave robust images that could not be easily removed from the substrates. When a metal tip with a curved tip at an angle of about 15° from vertical, with a weight of 528 g applied, was drawn across the image at a rate of approximately 13 mm/s no ink was visibly removed from the image. The tip is similar to a lathe round nose cutting bit with radius of curvature of approximately 12 mm.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

We claim:

1. A phase change ink composition comprising:
   a UV-curable component,
   a mono-amide crystalline component having an aromatic ring, wherein the aromatic ring is selected from the group consisting of a benzene group and a naphthalene group; and
   an amorphous component.

2. The composition of claim 1, wherein the crystalline and amorphous components are blended in a weight ratio of from about 60:40 to about 95:5, respectively.

3. The composition of claim 1, wherein the UV curable component and the crystalline component are blended in a weight ratio of from about 40:60 to about 5:95.

4. The composition of claim 1, wherein the amorphous component has a viscosity of from about 1 to about 100 cps at a temperature of about 140° C.

5. The composition of claim 1, wherein the amorphous component has a Tg value of from about 10 to about 50° C.

6. The composition of claim 1, wherein the UV curable component is (2-hydroxyl ethyl) isocyanurate triacrylate.

7. A phase change ink composition comprising:
   a UV-curable component;
   a crystalline component,
   an amorphous component selected from the group consisting of a polycyclic mono-amide and a polycyclic diamide.

8. The composition of claim 7, wherein the crystalline and amorphous components are blended in a weight ratio of from about 60:40 to about 95:5, respectively.

9. The composition of claim 7, wherein the UV curable component and the crystalline component are blended in a weight ratio of from about 40:60 to about 5:95.

10. The composition of claim 7, wherein the crystalline component exhibits crystallization (Tcrys) and melting (Tmelt) peaks according to differential scanning calorimetry and the difference between the peaks (Tmelt−Tcrys) is less than 55° C.

11. The composition of claim 7, wherein the UV curable component is (2-hydroxyl ethyl) isocyanurate triacrylate.

12. A phase change ink composition comprising:
    a UV-curable component;
    a crystalline component that is N-phenylethylbenzamide;
    an amorphous component that is 4-tert-butyl cyclohexyl, cyclohexyl tartrate.

13. The composition of claim 12, wherein the crystalline component and amorphous component are blended in a weight ratio of from about 60:40 and 95:5 respectively.

* * * * *